(12) United States Patent
Zhu et al.

(10) Patent No.: US 10,061,711 B2
(45) Date of Patent: Aug. 28, 2018

(54) FILE ACCESS METHOD AND APPARATUS, AND STORAGE SYSTEM

(71) Applicant: HUAWEI TECHNOLOGIES CO., LTD., Shenzhen, Guangdong (CN)

(72) Inventors: Guanyu Zhu, Shenzhen (CN); Jun Xu, Hangzhou (CN); Qun Yu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/445,349

(22) Filed: Feb. 28, 2017

(65) Prior Publication Data

US 2017/0168952 A1 Jun. 15, 2017

Related U.S. Application Data

(63) Continuation of application No. PCT/CN2014/085661, filed on Sep. 1, 2014.

(51) Int. Cl.
*G06F 12/00* (2006.01)
*G06F 12/1009* (2016.01)
*G06F 12/109* (2016.01)

(52) U.S. Cl.
CPC ......... *G06F 12/1009* (2013.01); *G06F 12/00* (2013.01); *G06F 12/109* (2013.01); *G06F 2212/1024* (2013.01); *G06F 2212/657* (2013.01)

(58) Field of Classification Search
CPC .... G06F 12/1009; G06F 12/00; G06F 12/109; G06F 2212/1024; G06F 2212/657
See application file for complete search history.

(56) References Cited

U.S. PATENT DOCUMENTS

| 4,742,447 A | 5/1988 | Duvall et al. |
| 4,742,450 A | 5/1988 | Duvall et al. |

(Continued)

FOREIGN PATENT DOCUMENTS

| CN | 86108127 A | 7/1987 |
| CN | 1517906 A | 8/2004 |

(Continued)

OTHER PUBLICATIONS

Louis Alex Eisner et al., "Quill: Exploiting Fast Non-Volatile Memory by Transparently Bypassing the File System," CS2013-0991, Jan. 28, 2013. total 6 pages.

(Continued)

*Primary Examiner* — Shawn X Gu
(74) *Attorney, Agent, or Firm* — Huawei Technologies Co., Ltd.

(57) ABSTRACT

A file access method and apparatus, and a storage system are provided. After receiving a file access request from a process, a first physical address space is accessed according to a preset first virtual address space and a preset first mapping relationship between the first virtual address space and the first physical address space, where the first physical address space stores a file system. After obtaining an index node of a target file from the first physical address space according to a file identifier of the target file carried in the file access request, a file page table of the target file is obtained according to file page table information. The file page table records a second physical address space in the first physical address space. The target file is accessed according to the second physical address space.

18 Claims, 7 Drawing Sheets

(56) References Cited

U.S. PATENT DOCUMENTS

| | | | |
|---|---|---|---|
| 5,873,120 | A | 2/1999 | Harvey |
| 8,495,750 | B2 * | 7/2013 | Rosu ............... H04W 4/003 |
| | | | 713/165 |
| 8,645,665 | B1 | 2/2014 | Bennett et al. |
| 2005/0209991 | A1 | 9/2005 | Rogers et al. |
| 2005/0246401 | A1 | 11/2005 | Edwards et al. |
| 2010/0199040 | A1 | 8/2010 | Schnapp et al. |
| 2014/0115021 | A1 | 4/2014 | Chen |
| 2014/0129814 | A1 | 5/2014 | Bi et al. |

FOREIGN PATENT DOCUMENTS

| | | |
|---|---|---|
| CN | 101075211 A | 11/2007 |
| CN | 101382953 A | 3/2009 |
| CN | 101882132 A | 11/2010 |
| CN | 101901263 A | 12/2010 |
| CN | 103218312 A | 7/2013 |
| CN | 103748565 A | 4/2014 |
| EP | 0229691 A2 | 7/1987 |
| JP | S62165251 A | 7/1987 |
| JP | 2014517941 A | 7/2014 |
| WO | 2012098211 A1 | 7/2012 |

OTHER PUBLICATIONS

Joel Coburn et al., "NV-Heaps: Making Persistent Objects Fast and Safe with Next-Generation, Non-Volatile Memories," ASPLOS '11, Mar. 5-11, 2011. total 13 pages.

* cited by examiner

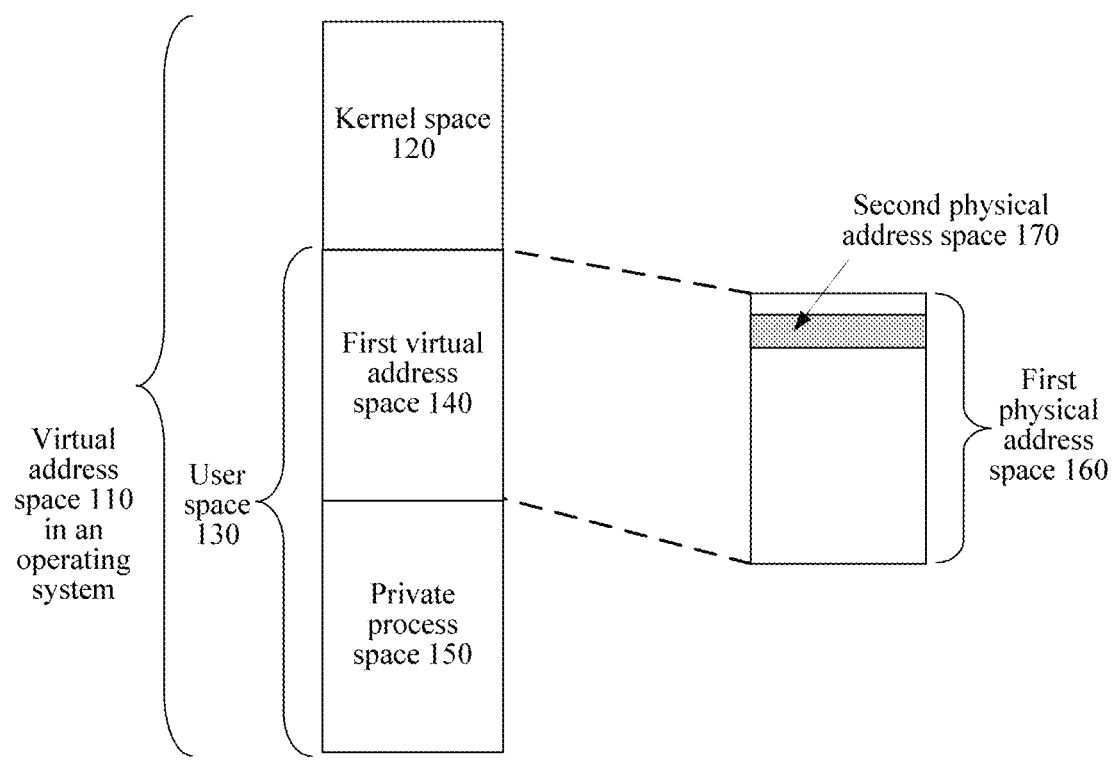
FIG. 1-a

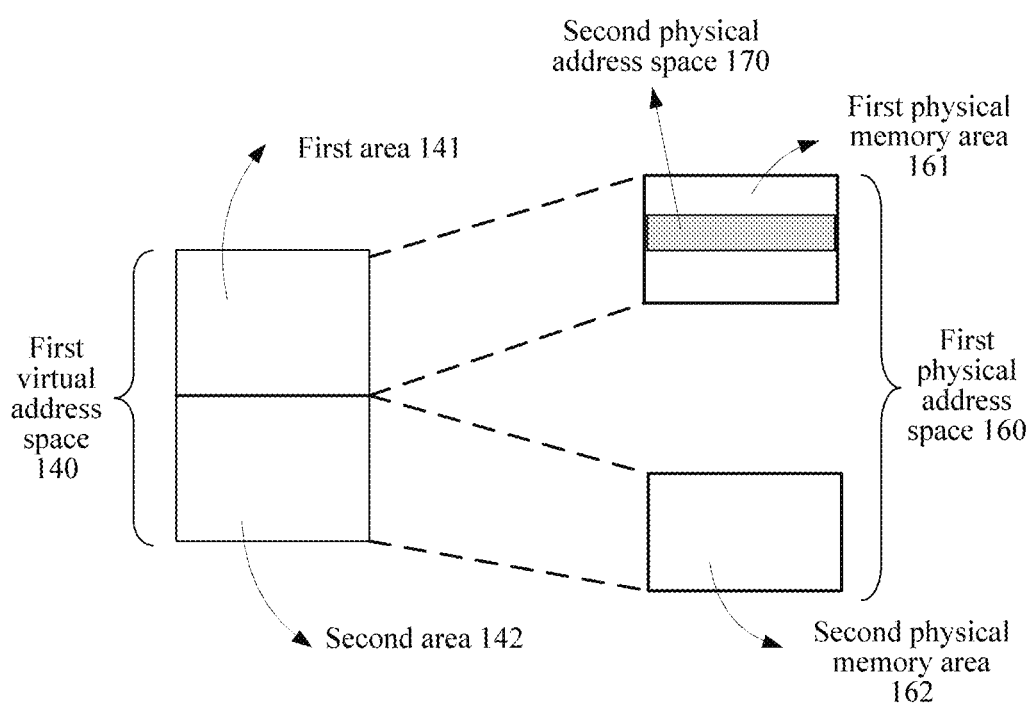
FIG. 1-b

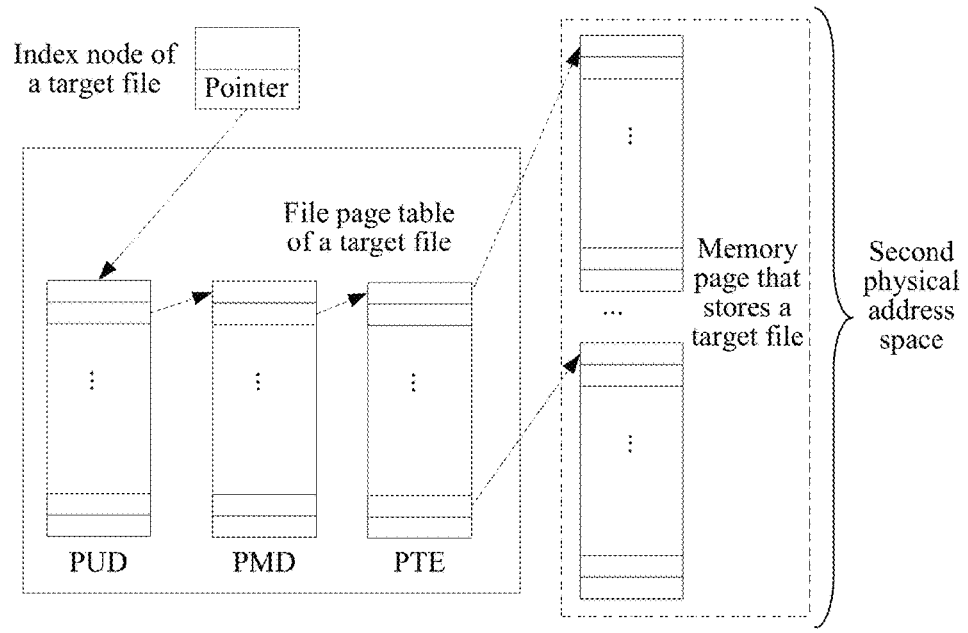

Allocate a second virtual address space to a target file, where the second virtual address space is a part of private space, allocated to a process, in user space in an operating system, and the second virtual address space is a contiguous address space ~ S251

Establish a second mapping relationship between a second physical address space and the second virtual address space ~ S252

Access the target file in the second physical address space according to the second virtual address space and the second mapping relationship ~ S253

FIG. 4

FILE ACCESS METHOD AND APPARATUS, AND STORAGE SYSTEM

CROSS-REFERENCE TO RELATED APPLICATIONS

This application is a continuation of International Application No. PCT/CN2014/085661, filed on Sep. 1, 2014, the disclosure of which is hereby incorporated by reference in its entirety.

TECHNICAL FIELD

Embodiments of the present disclosure relate to the computer field, and more specifically, to a file access method and apparatus, and a storage system.

BACKGROUND

In conventional technologies, a file system can be accessed only in kernel space. When a process needs to access a target file in the file system, a system call needs to be performed. Accessing a target file by means of switching from user space to kernel space affects a file access speed, and causes relatively high software running overheads.

Therefore, a method in which file access can be implemented directly in user space needs to be proposed.

SUMMARY

Embodiments of the present disclosure provide a file access method and apparatus, and a storage system, which cause relatively low software running overheads, and can implement file access in user space.

According to a first aspect, a file access method is provided, where the method includes:

receiving a file access request from a process, where the file access request includes a file identifier that indicates a to-be-accessed target file;

accessing a first physical address space according to a pre-set first virtual address space and a pre-set first mapping relationship between the first virtual address space and the first physical address space, where the first virtual address space is a part of user space in an operating system, and the first physical address space stores a file system and is a part of memory space;

obtaining an index node of the target file from the first physical address space according to the file identifier of the target file, where the index node includes file page table information of the target file;

obtaining a file page table of the target file according to the file page table information, i where the file page table records a second physical address space in the first physical address space, a data page of the target file is stored in the second physical address space, and the data page of the target file is used to store file data; and accessing the target file according to the second physical address space.

With reference to the first aspect, in a first possible implementation manner of the first aspect, the accessing the target file according to the second physical address space includes:

allocating a second virtual address space to the target file, where the second virtual address space is a part of private space in the user space in the operating system, where the private space is allocated to the process, and where the second virtual address space is a contiguous address space;

establishing a second mapping relationship between the second physical address space and the second virtual address space; and accessing the target file in the second physical address space based on the second mapping relationship.

With reference to the first possible implementation manner of the first aspect, in a second possible implementation manner of the first aspect, the establishing a second mapping relationship between the second physical address space and the second virtual address space includes:

establishing the second mapping relationship by linking the file page table of the target file to a process page table corresponding to the second virtual address space.

With reference to the first or the second possible implementation manner of the first aspect, in a third possible implementation manner of the first aspect, length of the second virtual address space is greater than length of the second physical address space; and the accessing the target file in the second physical address space based on the second mapping relationship includes:

performing a read operation on the target file in the second physical address space based on the second mapping relationship; and ending the read operation when a virtual address corresponding to data to be read through the read operation is not included in a virtual address space corresponding to the target file.

With reference to the first or the second possible implementation manner of the first aspect, in a fourth possible implementation manner of the first aspect, length of the second virtual address space is greater than length of the second physical address space; and the accessing the target file in the second physical address space based on the second mapping relationship includes:

performing a write operation on the target file in the second physical address space based on the second mapping relationship; and end the write operation when a virtual address corresponding to data to be written through the write operation is not included in the second virtual address space.

With reference to any one of the first aspect, or the first to the fourth possible implementation manners of the first aspect, in a fifth possible implementation manner of the first aspect, the method further includes:

establishing, in kernel space, the first mapping relationship between the first virtual address space and the first physical address space;

storing, in a process page table corresponding to the kernel space, a mapping page table corresponding to the first mapping relationship; and linking, to the process page table corresponding to the first virtual address space, the mapping page table corresponding to the first mapping relationship when a process page table corresponding to the first virtual address space does not record the first mapping relationship.

According to a second aspect, a file access apparatus is provided, where the apparatus includes:

a receiving module, configured to receive a file access request from a process, where the file access request includes a file identifier that indicates a to-be-accessed target file;

a first access module, configured to access a first physical address space according to a pre-set first virtual address space and a pre-set first mapping relationship between the first virtual address space and the first physical address space, where the first virtual address space is a part of user space in an operating system, and the first physical address space stores a file system and is a part of memory space;

an obtaining module, configured to obtain an index node of the target file from the first physical address space according to the file identifier that is of the target file and that is received by the receiving module, where the index node includes file page table information of the target file, and the obtaining module is further configured to obtain a file page table of the target file according to the file page table information, where the file page table records a second physical address space in the first physical address space, a data page of the target file is stored in the second physical address space, and the data page of the target file is used to store file data; and a second access module, configured to access the target file according to the second physical address space.

With reference to the second aspect, in a first possible implementation manner of the second aspect, the second access module includes:

an allocation unit, configured to allocate a second virtual address space to the target file, where the second virtual address space is a part of private space in the user space in the operating system, where the private space is allocated to the process, and where the second virtual address space is a contiguous address space;

an establishment unit, configured to establish a second mapping relationship between the second physical address space and the second virtual address space; and an access unit, configured to access the target file in the second physical address space based on the second mapping relationship.

With reference to the first possible implementation manner of the second aspect, in a second possible implementation manner of the second aspect, the establishment unit is specifically configured to establish the second mapping relationship by linking the file page table of the target file to a process page table corresponding to the second virtual address space.

With reference to the first or the second possible implementation manner of the second aspect, in a third possible implementation manner of the second aspect, length of the second virtual address space allocated by the allocation unit is greater than length of the second physical address space; and the access unit is specifically configured to:

perform a read operation on the target file in the second physical address space based on the second mapping relationship; and end the read operation when a virtual address corresponding to data to be read through the read operation is not included in a virtual address space corresponding to the target file.

With reference to the first or the second possible implementation manner of the second aspect, in a fourth possible implementation manner of the second aspect, length of the second virtual address space allocated by the allocation unit is greater than length of the second physical address space; and the access unit is specifically configured to:

perform a write operation on the target file in the second physical address space based on the second mapping relationship; and end the write operation when a virtual address corresponding to data to be written through the write operation is not included in the second virtual address space.

With reference to any one of the second aspect, or the first to the fourth possible implementation manners of the second aspect, in a fifth possible implementation manner of the second aspect, the apparatus further includes:

an establishment module, configured to: establish, in kernel space, the first mapping relationship between the first virtual address space and the first physical address space, and store, in a process page table corresponding to the kernel space, a mapping page table corresponding to the first mapping relationship;

a linking module, configured to link, to the process page table corresponding to the first virtual address space, the mapping page table corresponding to the first mapping relationship when a process page table corresponding to the first virtual address space does not record the first mapping relationship.

According to a third aspect, a storage system is provided, where the storage system includes:

a memory, configured to store a file and a program; and a processor, configured to execute the program, to implement:

receiving a file access request from a process, where the file access request includes a file identifier that indicates a to-be-accessed target file;

accessing a first physical address space according to a pre-set first virtual address space and a pre-set first mapping relationship between the first virtual address space and the first physical address space, where the first virtual address space is a part of user space in an operating system, and the first physical address space stores a file system and is a part of memory space;

obtaining an index node of the target file from the first physical address space according to the file identifier of the target file, where the index node includes file page table information of the target file;

obtaining a file page table of the target file according to the file page table information, where the file page table records a second physical address space in the first physical address space, a data page of the target file is stored in the second physical address space, and the data page of the target file is used to store file data; and accessing the target file according to the second physical address space.

With reference to the third aspect, in a first possible implementation manner of the third aspect, the processor is specifically configured to:

allocate a second virtual address space to the target file, where the second virtual address space is a part of private space in the user space in the operating system, where the private space is allocated to the process, and where the second virtual address space is a contiguous address space;

establish a second mapping relationship between the second physical address space and the second virtual address space; and access the target file in the second physical address space based on the second mapping relationship.

With reference to the first possible implementation manner of the third aspect, in a second possible implementation manner of the third aspect, the processor is specifically configured to establish the second mapping relationship by linking the file page table of the target file to a process page table corresponding to the second virtual address space.

With reference to the first or the second possible implementation manner of the third aspect, in a third possible implementation manner of the third aspect, length of the second virtual address space is greater than length of the second physical address space; and the processor is specifically configured to:

perform a read operation on the target file in the second physical address space based on the second mapping relationship; and end the read operation when a virtual address corresponding to data to be read through the read operation is not included in a virtual address space corresponding to the target file.

With reference to the first or the second possible implementation manner of the third aspect, in a fourth possible implementation manner of the third aspect, length of the second virtual address space is greater than length of the second physical address space; and the processor is specifically configured to:

perform a write operation on the target file in the second physical address space based on the second mapping relationship; and end the write operation when a virtual address corresponding to data to be written through the write operation is not included in the second virtual address space.

With reference to any one of the third aspect, or the first to the fourth possible implementation manners of the third aspect, in a fifth possible implementation manner of the third aspect, the processor is further configured to:

establish, in kernel space, the first mapping relationship between the first virtual address space and the first physical address space;

store, in a process page table corresponding to the kernel space, a mapping page table corresponding to the first mapping relationship; and link, to the process page table corresponding to the first virtual address space, the mapping page table corresponding to the first mapping relationship when a process page table corresponding to the first virtual address space does not record the first mapping relationship.

In the file access method and apparatus, and the storage system that are provided in the embodiments of the present disclosure, according to a mapping relationship between a first virtual address space in user space and a first physical address space that stores a file system, the first physical address space can be accessed using the first virtual address space, so that a target file in the file system can be accessed. In the file access method provided in the embodiments of the present disclosure, file access is implemented directly in user space, and frequent system calls during file access are avoided in the prior art, which can effectively reduce software running overheads during file access, and can increase a file access speed.

BRIEF DESCRIPTION OF DRAWINGS

To describe the technical solutions in the embodiments of the present disclosure more clearly, the following briefly introduces the accompanying drawings required for describing the embodiments.

FIG. 1-a is a schematic diagram of a virtual address space in an operating system according to an embodiment of the present disclosure;

FIG. 1-b is another schematic diagram of a virtual address space in an operating system according to an embodiment of the present disclosure;

FIG. 3 is a schematic diagram of a file page table according to an embodiment of the present disclosure;

FIG. 4 is a schematic flowchart of another file access method according to an embodiment of the present disclosure;

DESCRIPTION OF EMBODIMENTS

Figure 2:
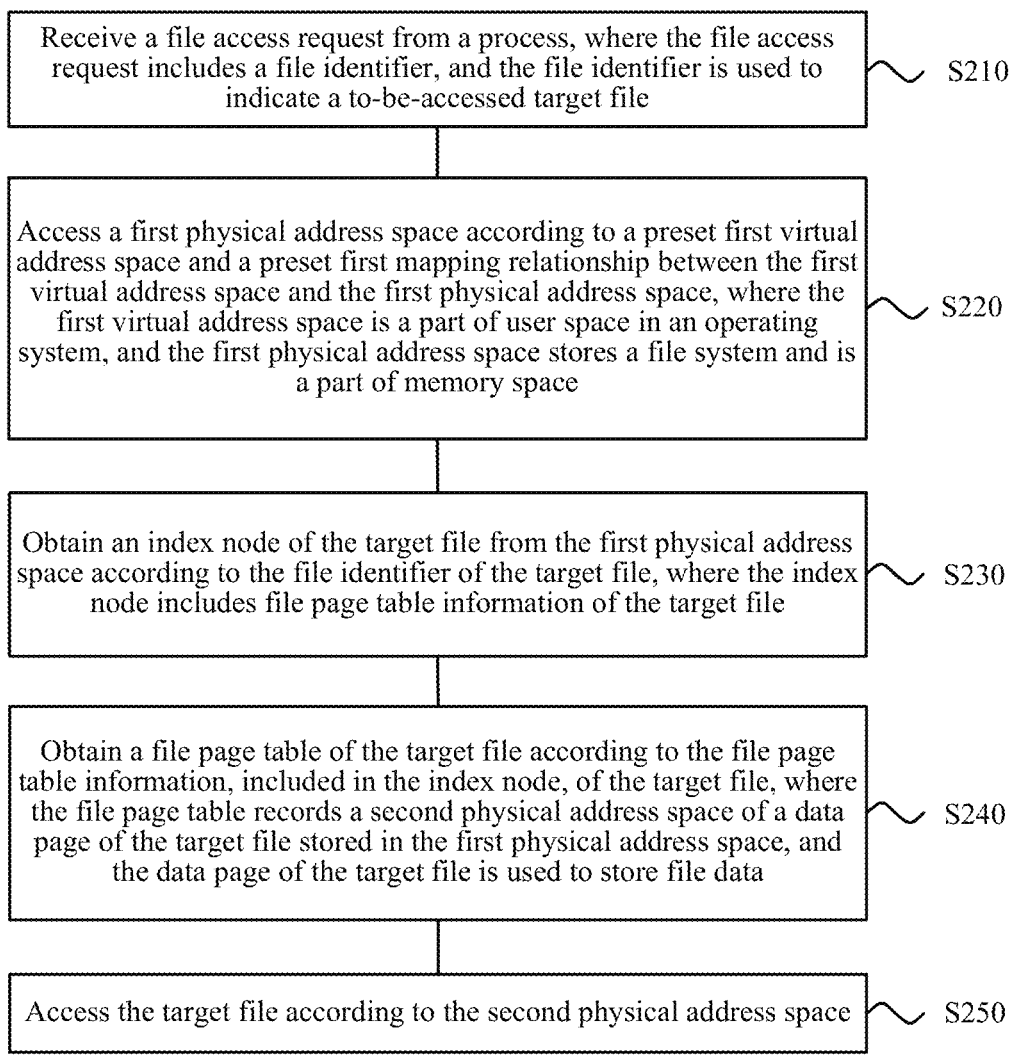
FIG. 2 is a schematic flowchart of a file access method according to an embodiment of the present disclosure.

The following clearly describes the technical solutions in the embodiments of the present disclosure with reference to the accompanying drawings in the embodiments of the present disclosure.

To easily understand the embodiments of the present disclosure, some related concepts are described first herein:

1. File System:

In an operating system, software used to store and manage file data is referred to as a file system. The file system is used to store and organize data, and define a file access policy. Data in the file system is classified into metadata and data, where the data refers to actual data in a common file, and the metadata refers to system data used to describe characteristics of a file. The metadata may include, for example, access permission, a file owner, and distribution information "inode" of a file data block. When a user needs to operate a file, the user needs to obtain metadata of the file first and then can orient the file and obtain file content or a related file attribute. The metadata is data about data, and in a file system field, each file is corresponding to one metadata structure. This structure includes a file attribute such as time for file creation, file modification, and file access, a file owner, permission, and mapping information.

There are three data structures in the file system: file, inode, and dentry. The following briefly describes the three important data structures.

(1) Open File Object "file"

A file structure represents an open file object (in the system, each open file is corresponding to one file structure in kernel space), and is created by a kernel upon opening the file and released upon closing the file.

(2) File Index Node Object "inode"

In the kernel, a file is represented using an inode structure, which is different from the file structure. The file structure represents a file descriptor of an open file. For one file, each time the file is opened, there may be a different file structure that represents a file descriptor, but all the file structures point to a unique inode.

(3) File Directory Object "dentry"

For a component of each path name searched by a process, the kernel creates a dentry structure. For example, when a path name /dev/test is searched, the kernel creates a level-1 dentry structure for a root directory "/", creates a level-2 dentry structure for "dev", and creates a level-3 dentry structure for test.

A conventional file system runs in kernel mode, and if a user mode process needs to access a file in the file system, a system call needs to be performed to implement file access.

2. System Call:

A system call is a widely used means of communication between kernel space and user space. The system call may be considered as a group of "special interfaces" provided by an operating system for calling a user program. A user program may use this group of "special interfaces" to obtain a system service provided by a kernel of the operating system. For example, a user may request a system call related to a file system, the system to open a file, close a file, or read/write a file. A root cause of providing a system service for user space by means of a system call is to perform system "protection". Linux running space is divided into kernel space and user space, where the kernel space and the user space run with different priority levels and are separate in logic. Generally, a process (running in the user space) is not allowed to access kernel data or use a kernel function, but can only operate user data or call a user function. When a process needs to access the kernel data (for example, access a file), the process accesses the kernel data using a "special interface" provided by the system for a user, that is, by means of a system call. Specifically, a request of the process is transferred to the kernel, and after processing of the request is complete in the kernel space, a processing result is returned to the user space (equivalent to returning to the process).

3. User Space and Kernel Space:

Linux running space is divided into kernel space (which may also be referred to as a kernel mode) and user space (which may also be referred to as a user mode), where the kernel space and the user space run with different priority levels and are separate in logic.

In the prior art, a virtual address space in an operating system is divided into two parts: user space (whose running environment may be referred to as a user mode) and kernel space (whose running environment may be referred to as a kernel mode). The user space is a virtual address space private to a process, where the process runs in the user space. The kernel space is specially used to manage a system resource. When a process needs to access a resource (for example, access a file), the process needs to apply to a kernel for the resource by means of a system call. To avoid frequent system calls when a process requests to access a file, the present disclosure provides a file access method and apparatus, which can effectively reduce software running overheads during file access.

To easily understand the technical solutions provided in the embodiments of the present disclosure, the following describes an application scenario of the embodiments of the present disclosure with reference to FIG. 1-*a* and FIG. 1-*b*.

As shown in FIG. 1-*a*, a virtual address space 110 in an operating system includes kernel space 120 and user space 130, where the user space 130 specifically includes shared process space and private process space. A first virtual address space 140 shown in FIG. 1-*a* is space, shared by all processes, in the user space 130. That is, in the user space 130, all the processes have permission to access the first virtual address space 140. Private process space 150 shown in FIG. 1-*a* is space, private to one process, in the user space 130. As shown in FIG. 1-*a*, a first mapping relationship exists between the first virtual address space 140 and a first physical address space 160 (shown by dashed lines in FIG. 1-*a*). The first physical address space 160 is a physical address space, in physical memory space, corresponding to a storage area that stores a file system. For example, if the file system includes a target file, the first physical address space 160 includes a second physical address space 170 (shown in FIG. 1-*a*) used to store the target file.

Specifically, a process page table corresponding to the first virtual address space 140 records the first mapping relationship. It should be understood that, based on the first mapping relationship, the first physical address space can be accessed using the first virtual address space, and therefore, a file in the file system can be accessed. For example, if a process needs to access the target file shown in FIG. 1-*a*, the target file in the second physical address space 170 can be accessed according to a virtual address space (that is, a mapped address space, in the first virtual address space 140, of the second physical address space 170) corresponding to the target file. Therefore, any process that needs to access the target file in the file system can implement access to the target file by accessing the first virtual address space, which can avoid frequent system calls in the prior art.

Optionally, the private process space 150 in FIG. 1-*a* may include two parts: file access space 151 and process activity space 152. The file access space 151 is used to map a to-be-opened target file (detailed in the following), and the process activity space 152 is space to which a common process activity belongs.

Optionally, the first mapping relationship between the first virtual address space 140 and the first physical address space 160 may be a linear mapping relationship, which can facilitate access to the first physical address space 160.

It should be understood that, the private process space 150 that is schematically shown in FIG. 1-*a* can represent private space of any one process, but a schematic block diagram shown in FIG. 1-*a* imposes no specific limitation on this embodiment of the present disclosure.

The first physical address space 160 in FIG. 1-*a* is a physical address space corresponding to the storage area, used to store the file system, in a physical memory. Further, as shown in FIG. 1-*b*, the first physical address space 160 used to store the file system may further be divided into: a first physical memory area 161 used to store metadata and data that are of the file system, and a second physical memory area 162 used to store buffered data generated during running of the file system. The buffered data generated during running of the file system specifically refers to data generated during file access by a process, such as a file object "file", a file index node object "inode", a file directory object "dentry", and a file descriptor (which may also be referred to as a handle). It should be understood that, the second physical address space 170 that is used to store the target file and that is in the first physical address space 160 is in the first physical memory area 161 (shown in FIG. 1-*b*). Optionally, the first physical memory area 161 and the second physical memory area 162 may be not contiguous in terms of physical address.

As shown in FIG. 1-*b*, the first mapping relationship exists between the first virtual address space 140 and the first physical address space 160. Therefore, corresponding to the two areas obtained through division of the first physical address space 160, the first virtual address space 140 may also correspondingly include two areas: a first area 141 and a second area 142. A mapped area, in the first virtual address space 140, of the first physical memory area 161 is the first area 141, and a mapped area, in the first virtual address space 140, of the second physical memory area 162 is the second area 142. It should be understood that, a process can access the first physical memory area 161 and the second physical memory area 162 respectively by accessing the first area 141 and the second area 142, so as to access the metadata and the data that are of the file system, and the buffered data generated during running of the file system. It should be understood that, the mapped address space, in the first virtual address space 140, of the second physical address space 170 that stores the target file is in the first area 141.

It may be understood that, the division of the first physical address space 160 into two areas is only an example. Alternatively, in an actual application, the first physical address space 160 may be divided into multiple areas according to an actual need, and certainly, in an actual application, the first virtual address space 140 may also be divided into multiple areas according to an actual need, which are not limited herein.

In the embodiments of the present disclosure, in one case, the first physical memory area 161 and the second physical memory area 162 both may use a non-volatile memory (NVM) medium, such as a phase change memory (PCM), a variable resistive random access memory (ReRAM), a magnetic random access memory (MRAM), or another non-volatile storage medium that has a read/write feature similar to that of a DRAM and that can be mounted on a memory bus for access. In another case, the first physical memory area 161 may use a non-volatile storage medium; the second physical memory area 162 may use a volatile storage medium, specifically, such as a dynamic random access memory (DRAM) medium with abrasion resistance.

A file access method 200 in an embodiment of the present disclosure may be executed by a controller or a central processing unit (CPU).

The following details file access methods according to the embodiments of the present disclosure with reference to FIG. 2 to FIG. 5. FIG. 2 is a schematic flowchart of a file access method according to an embodiment of the present disclosure. It should be noted that, in FIG. 2, a file access request of a process is used as an example for description. It may be understood that, the method 200 may be applied to any scenario in which a process requests to access a file. As shown in FIG. 2, the method 200 includes:

S210: Receive a file access request from a process, where the file access request includes a file identifier, and the file identifier is used to indicate a to-be-accessed target file.

Specifically, the file identifier may include a storage path of the target file, a file type of the target file (for example, a directory file or a data file), and the like. It should be understood that, the file access request may be specifically a file open request, a file read request, a file write request, or another access request.

S220: Access a first physical address space according to a preset first virtual address space and a preset first mapping relationship between the first virtual address space and the first physical address space, where the first virtual address space is a part of user space in an operating system, and the first physical address space stores a file system and is a part of memory space.

Optionally, in this embodiment of the present disclosure, S220 of accessing a first physical address space according to a preset first virtual address space and a preset first mapping relationship between the first virtual address space and the first physical address space, where the first physical address space stores a file system, includes:

S221: Access the first virtual address space according to the file access request.

S222: Determine that a process page table corresponding to the first virtual address space records the first mapping relationship between the first virtual address space and the first physical address space that stores the file system.

S223: Access the first physical address space according to the first virtual address space and the first mapping relationship.

Further, the first mapping relationship is a linear mapping relationship. Therefore, a start address of the first physical address space is corresponding to a start address of the first virtual address space, and so on for subsequent addresses, which facilitates access to the first physical address space.

S230: Obtain an index node of the target file from the first physical address space according to the file identifier of the target file, where the index node includes file page table information of the target file.

Optionally, in this embodiment of the present disclosure, S230 of obtaining an index node of the target file from the first physical address space according to the file identifier of the target file includes:

S231: Determine, according to the file identifier of the target file, whether the first physical address space stores the to-be-accessed target file indicated by the file identifier.

S232: When the first physical address space stores the to-be-accessed target file indicated by the file identifier, obtain the index node of the target file.

S233: When the first physical address space does not store the to-be-accessed target file indicated by the file identifier, create the target file in the first physical address space, and allocate an index node to the target file, where the index node allocated to the target file includes the file page table information of the target file, and a file page table is used to point to a second physical address space of the target file created in the first physical address space.

It should be understood that, each file in the file system is corresponding to one index node "inode". Therefore, an index node corresponding to the target file can be obtained after the first physical address space of the file system stores the target file. It should also be understood that, alternatively, the first physical address space can store the target file by default. In this scenario, a related step of determining whether the first physical address space stores the target file can be omitted.

The index node includes the file page table information of the target file. Specifically, the index node may include information that can be used to obtain the second physical address space, in the first physical address space, of a memory page that stores the target file. For example, the index node of the target file may record a file page table (FPT) of the target file, or a pointer that is used to point to a file page table of the target file. Specifically, as shown in FIG. 3, the index node of the target file includes a pointer that is used to point to a file page table, where the pointer specifically stores a highest-level file page table (for example, PUD) of the target file.

S240: Obtain a file page table of the target file according to the file page table information, included in the index node, of the target file, where the file page table records a second physical address space in the first physical address space, a data page of the target file is stored in the second physical address space, and the data page of the target file is used to store file data.

Specifically, the file page table of the target file is used to point to a physical address, in the first physical address space, of the memory page that stores the target file. Therefore, the second physical address space of the target file can be oriented according to the file page table of the target file.

Optionally, in this embodiment of the present disclosure, a data structure of the file page table of the target file is similar to or the same as that of the process page table.

It should be understood that, in the prior art, the process page table is used by a process in the operating system in protection mode, and represents a mapping relationship between virtual space and physical space that are of a process. For a given to-be-accessed virtual address, an MMU orients, in the current process page table according to the virtual address, a process page table entry corresponding to the virtual address, and then parses the page table entry to obtain an actual physical address, so as to implement access. There is different addressing space of the operating system, including 32-bit addressing space with a size of $2^{32}$ bytes, or 64-bit addressing space with a size of $2^{64}$ bytes. A common process page table may be a three-level page table or a four-level page table. The four-level page table includes a PGD, a PUD, a PMD, and a PTE. The three-level page table is compatible with the four-level page table, and also includes a PGD, a PUD, a PMD, and a PTE nominally. However, the PUD and the PMD belong to a same level of a page table. A higher-level page table entry includes a physical start address pointing to a lower-level page table entry, and the last-level page table entry PTE includes a physical start address pointing to a specific physical page.

In this embodiment of the present disclosure, the structure of the file page table may be the same as or similar to that of the process page table. Specifically, the file page table may be a single-level or multi-level page table, where each entry of each level of page table in a non-lowest page table records a physical start address of a lower-level page table, and each entry of a lowest-level page table records a physical start address of a memory page of a file. Specifically, as shown in FIG. 3, FIG. 3 gives an example in which the file page table of the target file is a three-level file page table including a PUD, a PMD, and a PTE. Each entry in a PUD records a physical start address of a PMD, each entry of a PMD records a physical start address of a PTE, and each entry of a PTE records a physical start address of a memory page (a memory page stores file content of the target file). It should be understood that, not all files need to use a three-level file page table, and even if a three-level page table is used, the page table does not definitely have a fixed format. For example, not all files need to use 1024 PTEs, and an organization structure of a file page table can be dynamically adjusted according to a change of a file size.

FIG. 3 provides a description using an example in which the index node of the target file records a pointer (for example, a physical start address of a PUD) pointing to a first-level file page table PUD of a three-level file page table. It may be further understood that, alternatively, the index node of the target file may directly store the second physical address space that stores the target file and that is in the first physical address space, a start address of the second physical address space, or the like. No specific limitation is imposed herein on information recorded in the index node of the target file provided that information related to the second physical address space of the target file can be obtained according to the information recorded in the index node of the target file.

It should be understood that, the example shown in FIG. 3 is to help a person skilled in the art better understand this embodiment of the present disclosure, but is not intended to limit the scope of this embodiment of the present disclosure. Obviously, a person skilled in the art can make various equivalent modifications or variations according to the example shown in FIG. 3, and such modifications or variations shall also fall within the scope of this embodiment of the present disclosure.

S250: Access the target file according to the second physical address space.

Specifically, there may be two methods for accessing, in the user space, the target file in the second physical address space. A first method is: obtaining, according to the first mapping relationship through computation, a target virtual address space that is obtained by mapping the second physical address space to the first virtual address space, and accessing, in the user space, the second physical address space by accessing the target virtual address space, so as to implement access to the target file. A second method is: allocating, in the user space, a segment of contiguous second virtual address space to the target file, and establishing a second mapping relationship between the second virtual address space and the second physical address space of the target file, so that the second physical address space can be accessed in the user space by accessing the second virtual address space, thereby implementing continuous access to the target file.

In the file access method according to this embodiment of the present disclosure, a target file in a first physical address space that stores a file system is accessed using a first virtual address space and according to a mapping relationship between the first virtual address space in user space and the first physical address space, so that file access is implemented directly in the user space without frequent system calls during file access in the prior art, which can effectively reduce software running overheads during file access, and can increase a file access speed.

The following details the second method for accessing, in the user space, the target file in the second physical address space with reference to FIG. 4.

As shown in FIG. 4, optionally, in the file access method 200 shown in FIG. 2, S250 of accessing the target file according to the second physical address space includes:

S251: Allocate the second virtual address space to the target file, where the second virtual address space is a part of private space, allocated to the process, in the user space in the operating system, and the second virtual address space is a contiguous address space.

Specifically, the second virtual address space may be a segment of contiguous virtual address space in the file access space 151 of the private process space 150 described above with reference to FIG. 1-a.

S252: Establish the second mapping relationship between the second physical address space and the second virtual address space.

Optionally, in this embodiment of the present disclosure, S252 of establishing the second mapping relationship between the second physical address space and the second virtual address space includes:

establishing the second mapping relationship by linking the file page table of the target file to a process page table corresponding to the second virtual address space.

Specifically, it is assumed that the process page table corresponding to the second virtual address space is an N-level page table while the file page table of the target file is an M-level page table, where M≤N, and the file page table lacks page table entries of level 0 to level (N−M−1). The linking the file page table of the target file to a process page table corresponding to the second virtual address space specifically refers to: copying highest (N−M) levels of page table entries of the file page table to (N−M) levels of page table entries of the process page table corresponding to the second virtual address space. According to this manner, the second mapping relationship can be established between the second virtual address space and the second physical address space of the target file. It can be learnt from the foregoing descriptions that, to establish the second mapping relationship in a "linking" manner, a highest-level page table entry of the file page table of the target file needs to be copied to a corresponding level of page table entry of the process page table corresponding to the second virtual address space. In this way, other page entries whose levels are lower than that of the highest-level (level (N–M)) page table entry of the file page table of the target file are automatically linked to the process page table corresponding to the second virtual address space. Therefore, in this "linking" manner, a quantity of copied page tables can be effectively reduced, and software running overheads can be reduced.

After the second mapping relationship is established between the second physical address space of the target file and the second virtual address space, the second physical address space can be accessed using the contiguous second virtual address space. Therefore, continuous access to the target file can be implemented.

S253: Access the target file in the second physical address space according to the second virtual address space and the second mapping relationship.

Specifically, a data page fault does not occur, that is, the target file can be accessed directly in the user space provided that an access address in the second virtual address space is included in a virtual address space corresponding to the target file. Compared with the prior art, a quantity of times of performing a system call is greatly reduced; therefore, software running overheads can be reduced, and a file access speed can be increased.

"The virtual address space corresponding to the target file" described above specifically refers to mapped space that is obtained by mapping the second physical address space of the target file to the second virtual address space. In other words, "the virtual address space corresponding to the target file" is a part of the second virtual address space. In addition, a mapping relationship exists between each virtual address in "the virtual address space corresponding to the target file" and a specific physical address (a physical address of the data page of the target file). Therefore, the second physical address space of the target file can be accessed by accessing "the virtual address space corresponding to the target file". S253 of accessing the target file in the second physical address space according to the second virtual address space and the second mapping relationship may also described as: accessing the target file in the second physical address space according to "the virtual address space corresponding to the target file" in the second virtual address space and the second mapping relationship.

Optionally, in this embodiment of the present disclosure, the second virtual address space allocated to the target file is equal to or greater than "the virtual address space corresponding to the target file". In other words, the second virtual address space allocated to the target file may be equal to or greater than the second physical address space of the target file.

The "data page fault" described above refers to interrupting a current access operation when the following case occurs: the process page table corresponding to the second virtual address space does not record a mapping relationship between a current access address and a specific physical address, that is, the process page table corresponding to the second virtual address space lacks an entry indicating the mapping relationship between the current access address and the specific physical address. Therefore, a physical address cannot be accessed using the current access address, and current access to the target file is interrupted.

Specifically, there are two cases: (1) If the second virtual address space is equal to "the virtual address space corresponding to the target file", when the target file is accessed using the second virtual address space, an access address definitely is included in "the virtual address space corresponding to the target file", and a mapping relationship exists between each virtual address in "the virtual address space corresponding to the target file" and a specific physical address (a physical address of the data page of the target file); therefore, in the foregoing case, the "data page fault" does not occur. (2) If the second virtual address space is greater than "the virtual address space corresponding to the target file", when the target file is accessed using the second virtual address space, the foregoing "data page fault" occurs because an access address is not included in "the virtual address space corresponding to the target file".

In the case in which the second virtual address space is greater than "the virtual address space corresponding to the target file", when a read and/or write operation is performed on the target file using the second virtual address space, out-of-bound access may occur. To reduce a read error caused by an out-of-bound read operation, in this embodiment of the present disclosure, S253 of accessing the target file in the second physical address space according to the second virtual address space and the second mapping relationship may include:

performing a read operation on the target file in the second physical address space according to the second virtual address space and the second mapping relationship; and when a virtual address corresponding to data to be read through the read operation is not included in the virtual address space corresponding to the target file, ending the read operation.

It should be understood that, "the virtual address space corresponding to the target file" in this embodiment refers to the foregoing mapped space that is obtained by mapping the second physical address space of the target file to the second virtual address space and that is a part of the second virtual address space.

Specifically, a file read instruction used for requesting to read the file data of the target file is received from the process; based on the second mapping relationship, the second physical address space is accessed using the second virtual address space, to perform the read operation on the target file; when a virtual address corresponding to data to be read through the read operation is not included in the virtual address space corresponding to the target file, the read operation ends. Specifically, when an end read address that is obtained after a start read address in the second virtual address space offsets a preset read byte length is not included in "the virtual address space corresponding to the target file", the read operation performed on the target file ends.

Optionally, in this embodiment of the present disclosure, a file descriptor "fd" of the target file and a file object "file" of the target file may be created in the second physical memory area 162 (shown in FIG. 1-*b*) of the first physical address space 160, and an association relationship between the file descriptor "fd" and the file object "file" of the target file is created. The file object "file" is used to record a size of the second virtual address space, a start address that is obtained by mapping the second physical address space of the target file to the second virtual address space, a file size of the target file, and other information. When the read operation request for the target file is received, the file descriptor "fd" of the target file in the second physical memory area 162 may be accessed using a virtual address (a mapped address, in the second area 142, of a physical address that stores the file descriptor "fd" and that is in the second physical memory area 162), corresponding to the file descriptor "fd" of the target file, in the second area 142 (shown in FIG. 1-*b*) of the first virtual address space, so as to obtain the size of the second virtual address space allocated to the target file, the start address that is obtained by mapping the second physical address space of the target file to the second virtual address space, the file size of the target file, and the other information, and further to perform a read operation on the target file using the second virtual address space.

Therefore, in the file access method according to this embodiment of the present disclosure, a problem of an out-of-bound read operation can be resolved, which can effectively ensure access security.

To reduce a write error caused by an out-of-bound write operation, in this embodiment of the present disclosure, if the second virtual address space is greater than the second physical address space, S253 of accessing the target file in the second physical address space according to the second virtual address space and the second mapping relationship includes:

performing a write operation on the target file in the second physical address space according to the second virtual address space and the second mapping relationship; and when a virtual address corresponding to data to be written through the write operation is not included in the second virtual address space, ending the write operation.

Specifically, a file write request for requesting to perform the write operation on the target file is received from the process; based on the second mapping relationship, the second physical address space is accessed using the second virtual address space, to perform the write operation on the target file; when a virtual address corresponding to data to be written through the write operation is not included in the second virtual address space, the write operation ends. Specifically, when an end write address that is obtained after a start write address in the second virtual address space offsets a preset write byte length is not included in the second virtual address space, the write operation performed on the target file ends.

Optionally, in this embodiment of the present disclosure, a file descriptor "fd" of the target file and a file object "file" of the target file may be created in the second physical memory area 162 (shown in FIG. 1-*b*) of the first physical address space 160, and an association relationship between the file descriptor "fd" and the file object "file" of the target file is created. The file object "file" is used to record a size of the second virtual address space, a start address that is obtained by mapping the second physical address space of the target file to the second virtual address space, a file size of the target file, and other information. When the write operation request for the target file is received, the file descriptor "fd" of the target file in the second physical memory area 162 may be accessed using a virtual address (a mapped address, in the second area 142, of a physical address that stores the file descriptor "fd" and that is in the second physical memory area 162), corresponding to the file descriptor "fd" of the target file, in the second area 142 (shown in FIG. 1-*b*) of the first virtual address space, so as to obtain the size of the second virtual address space allocated to the target file, the start address that is obtained by mapping the second physical address space of the target file to the second virtual address space, the file size of the target file, and the other information, and further to perform a write operation on the target file using the second virtual address space. As described above, in the case in which the second virtual address space is greater than "the virtual address space corresponding to the target file", the "data page fault" may occur when the write operation is performed on the target file using the second virtual address space. After interruption processing is complete, the write operation may continue to be performed on the target file.

Optionally, in this embodiment of the present disclosure, during a process of performing the write operation on the target file in the second physical address space according to the second virtual address space and the second mapping relationship:

when the process page table corresponding to the second virtual address space lacks an entry recording a mapped physical address, in the first physical address space, of a current write address, the write operation performed on the target file is interrupted, where the current write address is not included in the virtual address space corresponding to the target file;

a third physical address is allocated to the target file in the first physical address space, and an entry that is used to record a mapping relationship between the current write address and the third physical address is added to the process page table corresponding to the second virtual address space; and based on the mapping relationship recorded in the foregoing entry that is added to the process page table corresponding to the second virtual address space, the third physical address is accessed using the current write address, and the write operation continues to be performed on the target file.

In the file access method according to this embodiment of the present disclosure, a range of a file write operation can be increased, and a problem of out-of-bound access can be resolved, which can effectively ensure access security. In this embodiment of the present disclosure, the second virtual address space is a segment of contiguous address space, which facilitates implementation of one-off access, to physical memory pages within a required access length, from a start address of a virtual address corresponding to a to-be-accessed target file, without a need of using software to search for virtual addresses corresponding to different physical memory pages many times. In this way, sequential access to files can be implemented, and a file access speed can be increased. Further, translation between a virtual address and a physical address of the target file can be transparently completed using a memory management unit (MMU), which facilitates an increase in a file access speed, and can further reduce software running overheads. It should be understood that, alternatively, continuous access to the target file can be implemented using the second virtual address space by means of a load/store instruction for a central processing unit (CPU).

In this embodiment of the present disclosure, a target file is mapped to a segment of contiguous virtual address space in user space. On one hand, file access can be implemented in the user space when a quantity of system calls is reduced; on the other hand, a file access speed can be increased effectively and file access efficiency can be improved effectively.

Figure 5:
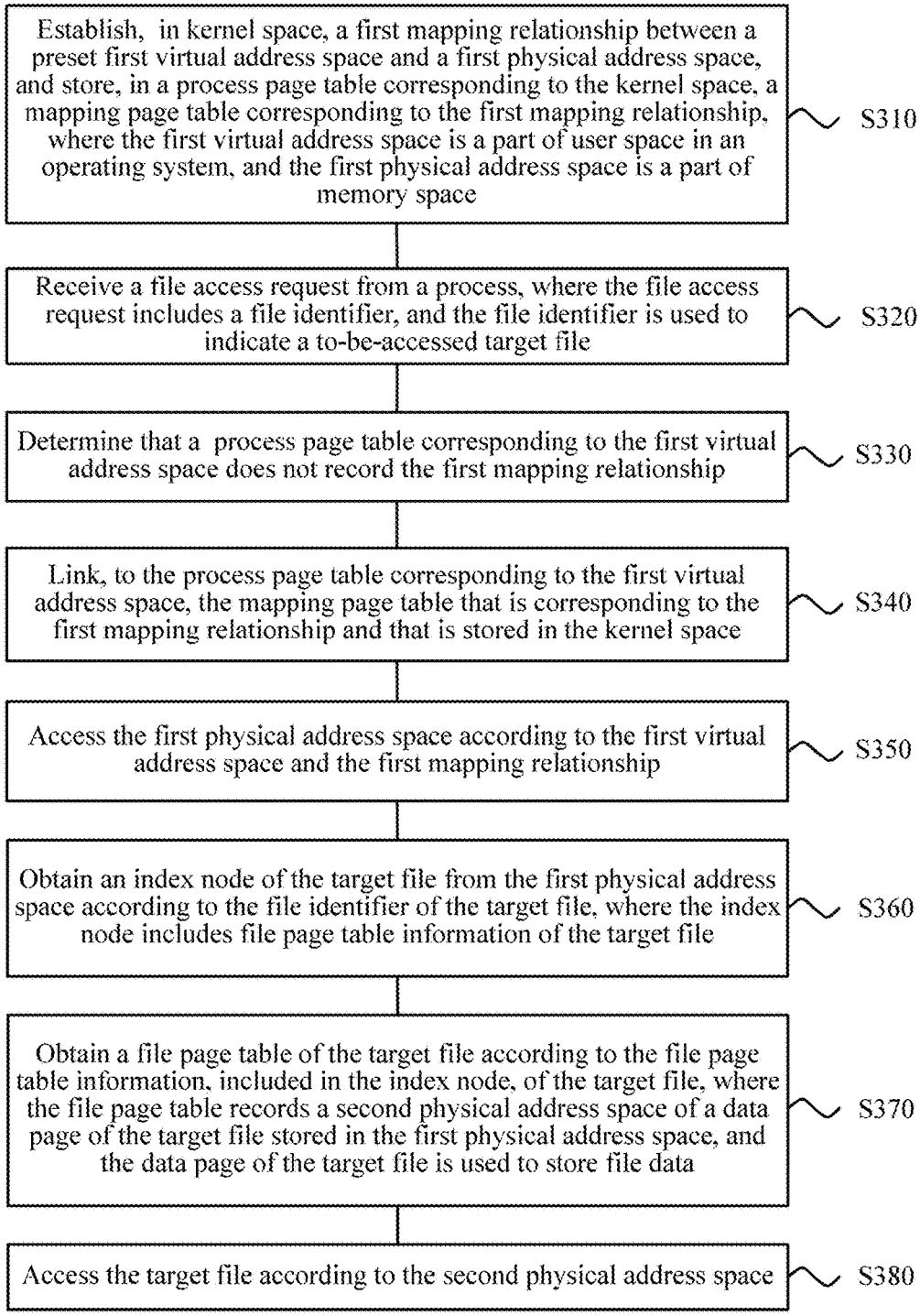
FIG. 5 is a schematic flowchart of still another file access method according to an embodiment of the present disclosure.

The following describes a file access method 300 according to another embodiment of the present disclosure with reference to FIG. 5. It should be noted that, in FIG. 5, a file access request of a process is used as an example for description. It may be understood that, the method 300 may be applied to any scenario in which a process requests to access a file. As shown in FIG. 5, the method 300 includes:

S310: Establish, in kernel space, a first mapping relationship between a preset first virtual address space and a first physical address space, and store, in a process page table corresponding to the kernel space, a mapping page table corresponding to the first mapping relationship, where the first virtual address space is a part of user space in an operating system, and the first physical address space is a part of memory space.

Specifically, during system initialization, the first mapping relationship (shown in FIG. 1-a and FIG. 1-b) between the first virtual address space and the first physical address space is established, and the mapping page table corresponding to the first mapping relationship is stored in the process page table corresponding to the kernel space. For example, the mapping page table corresponding to the first mapping relationship is stored in a shared-page global directory of the kernel space.

It should be understood that, before the first mapping relationship between the first virtual address space and the first physical address space is established in kernel space in S310, the first physical address space needs to be initialized. Specifically, after the system starts, if the first physical address space has been predefined, whether data stored in a header location of the segment of predefined physical address space meets a physical structure organization form of a file system is verified. If the data meets the organization form, initialization does not need to be performed; if the data does not meet the organization form, initialization is performed on the first physical address space. If the segment of physical address space is a blank memory area, the blank memory area is initialized according to the physical structure organization form of the file system. For example, the segment of physical memory area is formatted according to a factor such as a size of the first physical address space and a data organization structure of the file system. For example, the segment of physical memory area (that is, the first physical address space) is organized and managed by establishing a data structure such as a superblock or an index node.

S320: Receive a file access request from a process, where the file access request includes a file identifier, and the file identifier is used to indicate a to-be-accessed target file. S320 is the same as S210 shown in FIG. 2. For brevity, details are not described herein again.

S330: Determine that a process page table corresponding to the first virtual address space does not record the first mapping relationship.

Specifically, after the receiving the file access request from the process, when the first virtual address space is accessed in the user space, the process page table corresponding to the first virtual address space lacks an entry recording the first mapping relationship.

S340: Link, to the process page table corresponding to the first virtual address space, the mapping page table that is corresponding to the first mapping relationship and that is stored in the kernel space.

Specifically, the user space is switched to the kernel space, and the mapping page table that is corresponding to the first mapping relationship and that is stored in the kernel space is linked to the process page table corresponding to the first virtual address space, so that file access is subsequently implemented in the user space according to the first virtual address space and the first mapping relationship.

S350: Access the first physical address space according to the first virtual address space and the first mapping relationship. S350 is the same as S220 shown in FIG. 2, and details are not described herein again.

S360: Obtain an index node of the target file from the first physical address space according to the file identifier of the target file, where the index node includes file page table information of the target file. S360 is the same as S230 shown in FIG. 2, and details are not described herein again.

S370: Obtain a file page table of the target file according to the file page table information, included in the index node, of the target file, where the file page table records a second physical address space in the first physical address space, a data page of the target file is stored in the second physical address space, and the data page of the target file is used to store file data. S370 is the same as S240 shown in FIG. 2, and details are not described herein again.

S380: Access the target file according to the second physical address space. S380 is the same as S250 shown in FIG. 2, and details are not described herein again.

In the file access method according to this embodiment of the present disclosure, if the process page table corresponding to the first virtual address space does not record the first mapping relationship, a page fault needs to be executed one time. That is, the user space is switched to the kernel space, and the mapping page table corresponding to the first mapping relationship is linked to the process page table corresponding to the first virtual address space. If the process page table corresponding to the first virtual address space records the first mapping relationship, the first physical address space that stores the file system is accessed according to the first mapping relationship and the first virtual address space, so that a file in the file system is accessed. It should be noted that, in this embodiment of the present disclosure, the first virtual address space is space, shared by all processes, in the user space. For file access requests of all processes, access to a requested target file can be implemented directly in the user space.

It should be understood that, in this embodiment of the present disclosure, after the mapping page table corresponding to the first mapping relationship between the first virtual address space and the first physical address space is linked to the process table corresponding to the first virtual address space, if the system is not shut down, the process page table corresponding to the first virtual address space permanently stores the entry recording the first mapping relationship, and any process can subsequently implement, based on the first virtual address space, file access in the user space.

Compared with the prior art, in the file access method according to this embodiment of the present disclosure, file access can be implemented in user space when a quantity of system calls is reduced to a relatively great extent. Therefore, software running overheads can be reduced effectively during file access, and a file access speed can be increased effectively and file access efficiency can be improved effectively.

It should be understood that, the technical solution provided in this embodiment of the present disclosure may be applied to a Linux operating system, or may be applied to another operating system in which each process has its dedicated space.

Figure 6:
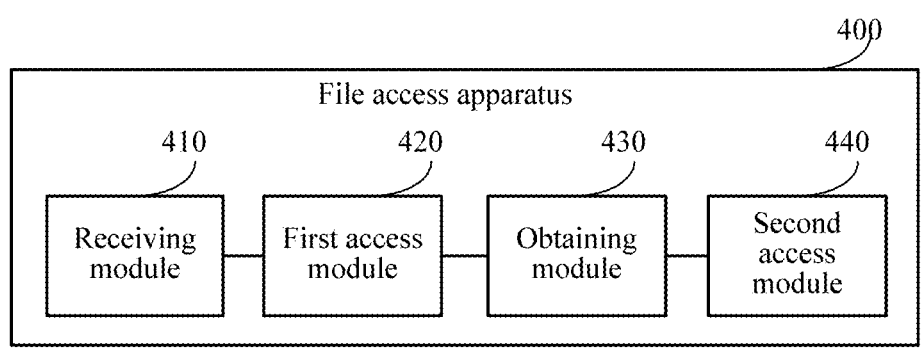
FIG. 6 is a schematic structural block diagram of a file access apparatus according to an embodiment of the present disclosure.
Figure 7:
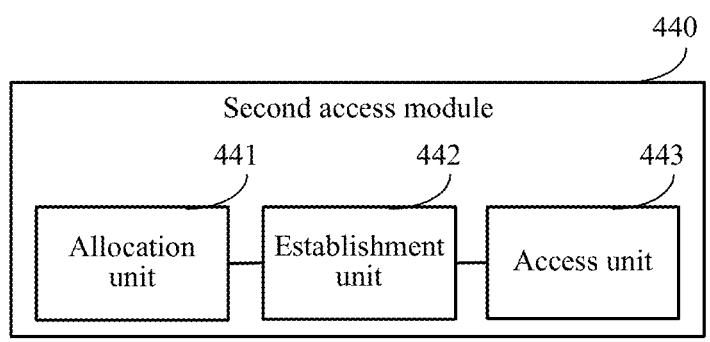
FIG. 7 is a schematic structural block diagram of another file access apparatus according to an embodiment of the present disclosure.
Figure 8:
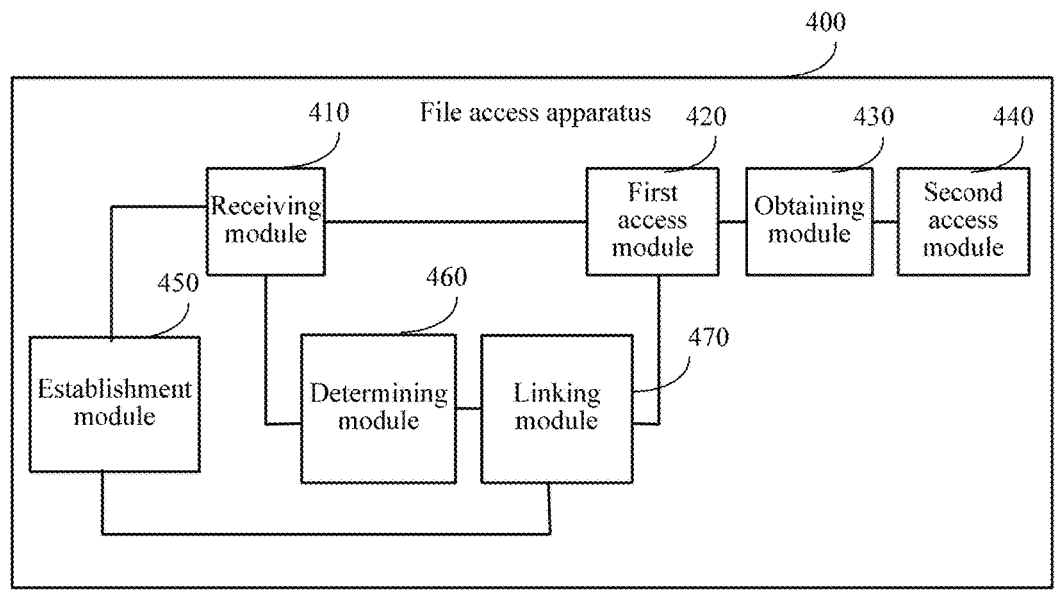
FIG. 8 is a schematic structural block diagram of still another file access apparatus according to an embodiment of the present disclosure.

The foregoing details the file access methods according to the embodiments of the present disclosure with reference to FIG. 1 to FIG. 5, and the following will detail a file access apparatus according to an embodiment of the present disclosure with reference to FIG. 6 to FIG. 8.

FIG. 6 is a schematic block diagram of a file access apparatus 400 according to an embodiment of the present disclosure. The apparatus 400 includes:

a receiving module 410, configured to receive a file access request from a process, where the file access request includes a file identifier, and the file identifier is used to indicate a to-be-accessed target file;

a first access module 420, configured to access a first physical address space according to a preset first virtual address space and a preset first mapping relationship between the first virtual address space and the first physical address space, where the first virtual address space is a part of user space in an operating system, and the first physical address space stores a file system and is a part of memory space;

an obtaining module 430, configured to obtain an index node of the target file from the first physical address space according to the file identifier that is of the target file and that is received by the receiving module, where the index node includes file page table information of the target file, and the obtaining module 430 is further configured to obtain a file page table of the target file according to the file page table information, included in the index node, of the target file, where the file page table records a second physical address space in the first physical address space, a data page of the target file is stored in the second physical address space, and the data page of the target file is used to store file data; and a second access module 440, configured to access the target file according to the second physical address space that is indicated by the file page table obtained by the obtaining module.

In the file access apparatus according to this embodiment of the present disclosure, a target file in a first physical address space that stores a file system is accessed using a first virtual address space and according to a mapping relationship between the first virtual address space in user space and the first physical address space, so that file access is implemented directly in the user space without frequent system calls during file access in the prior art, which can effectively reduce software running overheads during file access, and can increase a file access speed.

As shown in FIG. 7, optionally, in an embodiment, the second access module 440 includes:

an allocation unit 441, configured to allocate a second virtual address space to the target file, where the second virtual address space is a part of private space, allocated to the process, in the user space in the operating system, and the second virtual address space is a contiguous address space;

an establishment unit 442, configured to establish a second mapping relationship between the second physical address space and the second virtual address space allocated by the allocation unit; and an access unit 443, configured to access the target file in the second physical address space according to the second virtual address space allocated by the allocation unit and the second mapping relationship established by the establishment unit.

Optionally, in an embodiment, the establishment unit 442 is specifically configured to establish the second mapping relationship by linking the file page table of the target file to a process page table corresponding to the second virtual address space.

Optionally, in an embodiment, the second virtual address space allocated by the allocation unit is greater than the second physical address space; and the access unit is specifically configured to:

perform a read operation on the target file in the second physical address space according to the second virtual address space and the second mapping relationship; and when a virtual address corresponding to data to be read through the read operation is not included in a virtual address space corresponding to the target file, end the read operation.

Optionally, in an embodiment, the second virtual address space allocated by the allocation unit is greater than the second physical address space; and the access unit is specifically configured to:

perform a write operation on the target file in the second physical address space according to the second virtual address space and the second mapping relationship; and when a virtual address corresponding to data to be written through the write operation is not included in the second virtual address space, end the write operation.

As shown in FIG. 8, optionally, in an embodiment, the apparatus 400 includes:

an establishment module 450, configured to: establish, in kernel space, the first mapping relationship between the first virtual address space and the first physical address space, and store, in a process page table corresponding to the kernel space, a mapping page table corresponding to the first mapping relationship;

the receiving module 410, configured to receive the file access request from the process, where the file access request includes the file identifier, and the file identifier is used to indicate the to-be-accessed target file;

a determining module 460, configured to: after the receiving module 410 receives the file access request from the process, determine that a process page table corresponding to the first virtual address space does not record the first mapping relationship;

a linking module 470, configured to link, to the process page table corresponding to the first virtual address space, the mapping page table that is corresponding to the first mapping relationship established by the establishment module and that is stored in the kernel space;

the first access module 420, configured to access the first physical address space according to the preset first virtual address space and the preset first mapping relationship between the first virtual address space and the first physical address space, where the first virtual address space is a part of the user space in the operating system, and the first physical address space stores the file system and is a part of the memory space;

the obtaining module 430, configured to obtain the index node of the target file from the first physical address space according to the file identifier that is of the target file and that is received by the receiving module, where the index node includes the file page table information of the target file; and the obtaining module 430 is further configured to obtain the file page table of the target file according to the file page table information, included in the index node, of the target file, where the file page table records the second physical address space of the data page of the target file stored in the first physical address space, and the data page of the target file is used to store the file data; and the second access module 440, configured to access the target file according to the second physical address space that is indicated by the file page table obtained by the obtaining module.

It should be understood that, the establishment module 450 establishes the first mapping relationship in the kernel space before the receiving module 410 receives the file access request. It should also be understood that, the first access module 420 accesses the first physical address space according to the first virtual address space and the first mapping relationship if the linking module 470 links, to the process page table corresponding to the first virtual address space, the mapping page table that is corresponding to the first mapping relationship established by the establishment module and that is stored in the kernel space.

It should be understood that, the foregoing and other operations and/or functions of each module in the file access apparatus 400 according to this embodiment of the present disclosure are separately intended to implement corresponding procedures of the methods shown in FIG. 2, FIG. 4, and FIG. 5. For brevity, details are not described herein again.

In the file access apparatus according to this embodiment of the present disclosure, a target file in a first physical address space that stores a file system is accessed using a first virtual address space and according to a mapping relationship between the first virtual address space in user space and the first physical address space, so that file access is implemented directly in the user space without frequent system calls during file access in the prior art, which can effectively reduce software running overheads during file access, and can increase a file access speed.

Figure 9:
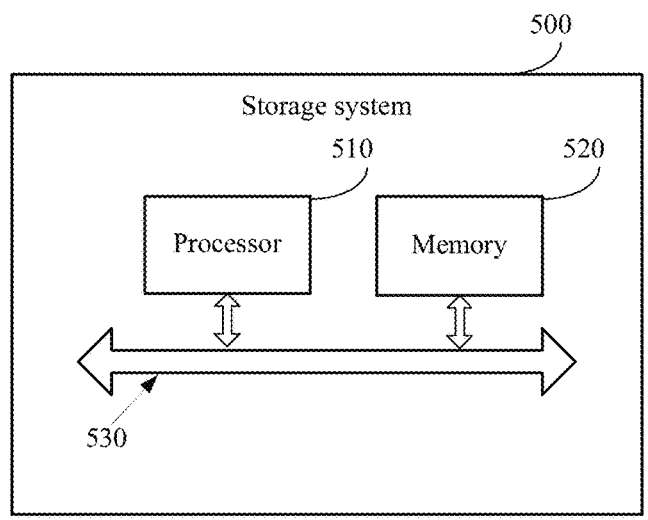
FIG. 9 is a schematic structural block diagram of a storage system according to an embodiment of the present disclosure.

As shown in FIG. 9, an embodiment of the present disclosure further provides a schematic structural diagram of a storage system. The storage system 500 includes a processor 510, a memory 520, and a bus system 530. The processor 510 is connected to the memory 520 using the bus system 530, and the memory 520 is configured to store a file and a program. The processor 510 is configured to execute the program stored in the memory 520. The processor 510 invokes, using the bus system 530, code stored in the memory 520, to implement: receiving a file access request from a process, where the file access request includes a file identifier, and the file identifier is used to indicate a to-be-accessed target file; accessing a first physical address space according to a preset first virtual address space and a preset first mapping relationship between the first virtual address space and the first physical address space, where the first virtual address space is a part of user space in an operating system, and the first physical address space stores a file system and is a part of memory space; obtaining an index node of the target file from the first physical address space according to the file identifier of the target file, where the index node includes file page table information of the target file; obtaining a file page table of the target file according to the file page table information, included in the index node, of the target file, where the file page table records a second physical address space in the first physical address space, a data page of the target file is stored in the second physical address space, and the data page of the target file is used to store file data; and accessing the target file according to the second physical address space.

In the storage system according to this embodiment of the present disclosure, a target file in a first physical address space that stores a file system is accessed using a first virtual address space and according to a mapping relationship between the first virtual address space in user space and the first physical address space, so that file access is implemented directly in the user space without frequent system calls during file access in the prior art, which can effectively reduce software running overheads during file access, and can increase a file access speed.

Optionally, the processor 510 invokes, using the bus system 530, the code stored in the memory 520, to specifically implement: allocating a second virtual address space to the target file, where the second virtual address space is a part of private space, allocated to the process, in the user space in the operating system, and the second virtual address space is a contiguous address space; establishing a second mapping relationship between the second physical address space and the second virtual address space; and accessing the target file in the second physical address space according to the second virtual address space and the second mapping relationship.

Optionally, the processor 510 invokes, using the bus system 530, the code stored in the memory 520, to specifically implement: establishing the second mapping relationship by linking the file page table of the target file to a process page table corresponding to the second virtual address space.

Optionally, the second virtual address space is greater than the second physical address space. The processor 510 invokes, using the bus system 530, the code stored in the memory 520, to specifically implement: performing a read operation on the target file in the second physical address space according to the second virtual address space and the second mapping relationship; and when a virtual address corresponding to data to be read through the read operation is not included in a virtual address space corresponding to the target file, ending the read operation.

Optionally, the second virtual address space is greater than the second physical address space. The processor 510 invokes, using the bus system 530, the code stored in the memory 520, to specifically implement: performing a write operation on the target file in the second physical address space according to the second virtual address space and the second mapping relationship; and when a virtual address corresponding to data to be written through the write operation is not included in the second virtual address space, ending the write operation.

Optionally, the processor 510 invokes, using the bus system 530, the code stored in the memory 520, to further implement: establishing, in kernel space, the first mapping relationship between the first virtual address space and the first physical address space, and storing, in a process page table corresponding to the kernel space, a mapping page table corresponding to the first mapping relationship; after the receiving the file access request from the process, determining that a process page table corresponding to the first virtual address space does not record the first mapping relationship; and linking, to the process page table corresponding to the first virtual address space, the mapping page table that is corresponding to the first mapping relationship and that is stored in the kernel space.

It should be understood that, in this embodiment of the present disclosure, the processor 510 may be a central processing unit (CPU), or the processor 510 may be another general purpose processor, a digital signal processor (DSP), an application-specific integrated circuit (ASIC), a field programmable gate array (FPGA) or another programmable logic device, a transistor logic device, a hardware component, or the like. The general purpose processor may be a microprocessor, or the processor may be any regular processor or the like.

The memory 520 may include a read-only memory and a random access memory, and provides an instruction and data for the processor 510. The memory 520 may further include a non-volatile random access memory, which is configured to store a file. For example, the memory 520 may further store information such as a device type.

In addition to a data bus, the bus system 530 may also include a power bus, a control bus, a status signal bus, and the like. However, for clear description, all buses in the figure are labeled as the bus system 530.

The storage system 500 in this embodiment of the present disclosure may include a device such as a computer, a server, a storage array in which a file system is established. It should be noted that, in the storage system 500, an NVM may be mounted on a memory bus, and the file system is established in the NVM.

During an implementation process, steps in the foregoing methods may be completed using an integrated logic circuit of hardware in the processor 510 or an instruction in software form. The steps in the methods disclosed with reference to the embodiments of the present disclosure may be executed directly by a hardware processor, or executed by a combination of hardware in a processor and a software module. The software module may be located in a storage medium that is mature in the prior art, such as a random access memory, a flash memory, a read-only memory, a programmable read-only memory, an electrically erasable programmable read-only memory, or a register. The storage medium is located in the memory 520. The processor 510 reads information from the memory 520, and completes the steps of the foregoing methods with reference to the hardware of the processor 510. To avoid repetition, details are not described herein again.

It should be understood that, the storage system 500 according to this embodiment of the present disclosure may be corresponding to the file access apparatus 400 according to the foregoing embodiment of the present disclosure, and the storage system 500 may implement the methods shown in FIG. 2, FIG. 4, and FIG. 5. For brevity, details are not described herein again.

In the storage system according to this embodiment of the present disclosure, a target file in a first physical address space that stores a file system is accessed using a first virtual address space and according to a mapping relationship between the first virtual address space in user space and the first physical address space, so that file access is implemented directly in the user space without frequent system calls during file access in the prior art, which can effectively reduce software running overheads during file access, and can increase a file access speed.

It should be understood that in the specification, claims, and accompanying drawings of the present disclosure, the terms "first", "second", "third", and so on are intended to distinguish between different objects but do not indicate a particular order. In addition, the terms "include", "contain", or any other variant thereof, are intended to cover a non-exclusive inclusion. For example, a process, a method, a system, a product, or an apparatus that includes a series of steps or modules is not limited to the listed steps or modules, but optionally further includes an unlisted step or module, or optionally further includes another inherent step or module of the process, the method, the product, or the apparatus.

It should also be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes: any non-transitory machine-readable medium that can store program code, such as a USB flash drive, a removable hard disk, a read-only memory (ROM), a random access memory (RAM), a magnetic disk, or an optical disc.

A person skilled in the art may clearly know that, for convenience and conciseness of description, in the foregoing embodiments, the embodiments emphasize different aspects, and for a part not described in detail in one embodiment, reference may be made to a relevant description of another embodiment. Features disclosed in the embodiments of the present disclosure, claims, and the accompanying drawings may exist independently, or exist in a combination. Features described in a hardware form in the embodiments of the present disclosure may be executed by software, and vice versa, which is not limited herein.

What is claimed is:

1. A file access method, comprising:
receiving a file access request from a process, wherein the file access request comprises a file identifier that indicates a to-be-accessed target file;
accessing a first physical address space according to a pre-set first virtual address space and a pre-set first mapping relationship between the first virtual address space and the first physical address space, wherein the first virtual address space is a part of user space in an operating system, and the first physical address space stores a file system and is a part of memory space;
obtaining an index node of the target file from the first physical address space according to the file identifier of the target file, wherein the index node comprises file page table information of the target file;
obtaining a file page table of the target file according to the file page table information, wherein the file page table records a second physical address space in the first physical address space, a data page of the target file is stored in the second physical address space, and the data page of the target file stores file data; and accessing the target file according to the second physical address space.

2. The method according to claim 1, wherein the accessing the target file according to the second physical address space comprises:

allocating a second virtual address space to the target file, wherein the second virtual address space is a part of private space in the user space in the operating system, wherein the private space is allocated to the process, and wherein the second virtual address space is a contiguous address space;

establishing a second mapping relationship between the second physical address space and the second virtual address space; and accessing the target file in the second physical address space based on the second mapping relationship.

3. The method according to claim 2, wherein the establishing a second mapping relationship between the second physical address space and the second virtual address space comprises:

establishing the second mapping relationship by linking the file page table of the target file to a process page table corresponding to the second virtual address space.

4. The method according to claim 2, wherein length of the second virtual address space is greater than length of the second physical address space; and the accessing the target file in the second physical address space based on the second mapping relationship comprises:

performing a read operation on the target file in the second physical address space based on the second mapping relationship; and ending the read operation when a virtual address corresponding to data to be read through the read operation is not included in a virtual address space corresponding to the target file.

5. The method according to claim 2, wherein length of the second virtual address space is greater than length of the second physical address space; and accessing the target file in the second physical address space based on the second mapping relationship comprises:

performing a write operation on the target file in the second physical address space based on the second mapping relationship; and ending the write operation when a virtual address corresponding to data to be written through the write operation is not included in the second virtual address space.

6. The method according to claim 1, wherein the method further comprises:

establishing, in kernel space, the first mapping relationship between the first virtual address space and the first physical address space;

storing, in a process page table corresponding to the kernel space, a mapping page table corresponding to the first mapping relationship; and linking, to a process page table corresponding to the first virtual address space, the mapping page table corresponding to the first mapping relationship stored in the process page table corresponding to the kernel space when the process page table corresponding to the first virtual address space does not record the first mapping relationship.

7. A storage system, comprising:

a memory, configured to store a file; and a processor, coupled to the memory and configured to:

receive a file access request from a process, wherein the file access request comprises a file identifier that indicates a to-be-accessed target file in the memory;

access a first physical address space according to a pre-set first virtual address space and a pre-set first mapping relationship between the first virtual address space and the first physical address space, wherein the first virtual address space is a part of user space in an operating system, and the first physical address space stores a file system and is a part of memory space;

obtain an index node of the target file from the first physical address space according to the file identifier of the target file, wherein the index node comprises file page table information of the target file;

obtain a file page table of the target file according to the file page table information, wherein the file page table records a second physical address space in the first physical address space, a data page of the target file is stored in the second physical address space, and the data page of the target file is used to store file data; and access the target file according to the second physical address space.

8. The storage system according to claim 7, wherein in the step of accessing the target file, the processor is configured to:

allocate a second virtual address space to the target file, wherein the second virtual address space is a part of private space in the user space in the operating system, wherein the private space is allocated to the process, and wherein the second virtual address space is a contiguous address space;

establish a second mapping relationship between the second physical address space and the second virtual address space; and access the target file in the second physical address space based on the second mapping relationship.

9. The storage system according to claim 8, wherein the processor is configured to establish the second mapping relationship by linking the file page table of the target file to a process page table corresponding to the second virtual address space.

10. The storage system according to claim 8, wherein length of the second virtual address space is greater than length of the second physical address space; and wherein in the step of accessing the target file, the processor is configured to:

perform a read operation on the target file in the second physical address space based on the second mapping relationship; and end the read operation when a virtual address corresponding to data to be read through the read operation is not included in a virtual address space corresponding to the target file.

11. The storage system according to claim 8, wherein length of the second virtual address space is greater than length of the second physical address space; and wherein in the step of accessing the target file, the processor is configured to:

perform a write operation on the target file in the second physical address space based on the second mapping relationship; and end the write operation when a virtual address corresponding to data to be written through the write operation is not included in the second virtual address space.

12. The storage system according to claim 7, wherein the processor is further configured to:
   establish, in kernel space, the first mapping relationship between the first virtual address space and the first physical address space; and
   store, in a process page table corresponding to the kernel space, a mapping page table corresponding to the first mapping relationship,
   wherein the processor is further configured to:
   link, to a process page table corresponding to the first virtual address space, the mapping page table corresponding to the first mapping relationship stored in the process page table corresponding to the kernel space when the process page table corresponding to the first virtual address space does not record the first mapping relationship.

13. A non-transitory computer-readable storage medium comprising instructions which, when executed by a computer, cause the computer to carry out:
   receiving a file access request from a process, wherein the file access request comprises a file identifier that indicates a to-be-accessed target file;
   accessing a first physical address space according to a pre-set first virtual address space and a pre-set first mapping relationship between the first virtual address space and the first physical address space, wherein the first virtual address space is a part of user space in an operating system, and the first physical address space stores a file system and is a part of memory space;
   obtaining an index node of the target file from the first physical address space according to the file identifier of the target file, wherein the index node comprises file page table information of the target file;
   obtaining a file page table of the target file according to the file page table information, wherein the file page table records a second physical address space in the first physical address space, a data page of the target file is stored in the second physical address space, and the data page of the target file is used to store file data; and
   accessing the target file according to the second physical address space.

14. The non-transitory computer-readable storage medium according to claim 13, wherein the instructions which cause the computer to carry out the step of the accessing the target file further comprise:
   allocating a second virtual address space to the target file, wherein the second virtual address space is a part of private space in the user space in the operating system, wherein the private space is allocated to the process, and wherein the second virtual address space is a contiguous address space;
   establishing a second mapping relationship between the second physical address space and the second virtual address space; and
   accessing the target file in the second physical address space based on the second mapping relationship.

15. The non-transitory computer-readable storage medium according to claim 14, wherein the instructions which cause the computer to carry out the step of the establishing a second mapping relationship comprise:
   establishing the second mapping relationship by linking the file page table of the target file to a process page table corresponding to the second virtual address space.

16. The non-transitory computer-readable storage medium according to claim 14, wherein the instructions which cause the computer to carry out the step of the accessing the target file comprise:
   performing a read operation on the target file in the second physical address space based on the second mapping relationship, wherein length of the second virtual address space is greater than length of the second physical address space; and
   ending the read operation when a virtual address corresponding to data to be read through the read operation is not included in a virtual address space corresponding to the target file.

17. The non-transitory computer-readable storage medium according to claim 14, wherein the instructions which cause the computer to carry out the step of the accessing the target file comprises:
   performing a write operation on the target file in the second physical address space based on the second mapping relationship, wherein length of the second virtual address space is greater than length of the second physical address space; and
   ending the write operation when a virtual address corresponding to data to be written through the write operation is not included in the second virtual address space.

18. The non-transitory computer-readable storage medium according to claim 13, further comprising instructions which, when executed by a computer, cause the computer to carry out:
   establishing, in kernel space, the first mapping relationship between the first virtual address space and the first physical address space;
   storing, in a process page table corresponding to the kernel space, a mapping page table corresponding to the first mapping relationship; and
   linking, to a process page table corresponding to the first virtual address space, the mapping page table corresponding to the first mapping relationship stored in the process page table corresponding to the kernel space when the process page table corresponding to the first virtual address space does not record the first mapping relationship.

* * * * *